(12) United States Patent
Zhang et al.

(10) Patent No.: US 11,170,512 B2
(45) Date of Patent: Nov. 9, 2021

(54) IMAGE PROCESSING APPARATUS AND METHOD, AND IMAGE PROCESSING SYSTEM

(71) Applicant: CANON KABUSHIKI KAISHA, Tokyo (JP)

(72) Inventors: Zhiyuan Zhang, Beijing (CN); Yaohai Huang, Beijing (CN); Deyu Wang, Beijing (CN)

(73) Assignee: Canon Kabushiki Kaisha, Tokyo (JP)

( * ) Notice: Subject to any disclaimer, the term of this patent is extended or adjusted under 35 U.S.C. 154(b) by 35 days.

(21) Appl. No.: 16/733,694

(22) Filed: Jan. 3, 2020

(65) Prior Publication Data

US 2020/0219269 A1 Jul. 9, 2020

(30) Foreign Application Priority Data

Jan. 9, 2019 (CN) .......................... 201910018399.9

(51) Int. Cl.
*G06T 7/246* (2017.01)
*G06K 9/32* (2006.01)
*G06K 9/00* (2006.01)

(52) U.S. Cl.
CPC .......... *G06T 7/248* (2017.01); *G06K 9/00744* (2013.01); *G06K 9/00771* (2013.01); *G06K 9/3241* (2013.01); *G06T 2207/10016* (2013.01)

(58) Field of Classification Search
CPC combination set(s) only.
See application file for complete search history.

(56) References Cited

U.S. PATENT DOCUMENTS

| | | | |
|---|---|---|---|
| 2016/0203361 A1* | 7/2016 | Black | G06K 9/6221 382/203 |
| 2017/0337711 A1* | 11/2017 | Ratner | H04N 19/176 |
| 2021/0004967 A1* | 1/2021 | Akiyama | G06T 7/74 |
| 2021/0089816 A1* | 3/2021 | Amon | G06T 7/143 |

OTHER PUBLICATIONS

Kai Kang, Object Detection in Videos with Tubelet Proposal Networks, arXiv:1702.06355v2 [cs.CV] Apr. 10, 2017, 9 pages.

* cited by examiner

*Primary Examiner* — Omar S Ismail
(74) *Attorney, Agent, or Firm* — Canon U.S.A., Inc. IP Division

(57) ABSTRACT

An image processing apparatus for extracting features from video frames of a video; and determining, for non-initial video frames, reference information of an object detected in a previous video frame thereof in a corresponding non-initial video frame with respect to object information of the object; and detecting an object from an initial video frame based on the features and detects an object from non-initial video frames based on the features and the determined reference information. The processing time of the object detection processing can be reduced, and the real-time requirements of object detection in the video can be better satisfied.

20 Claims, 11 Drawing Sheets

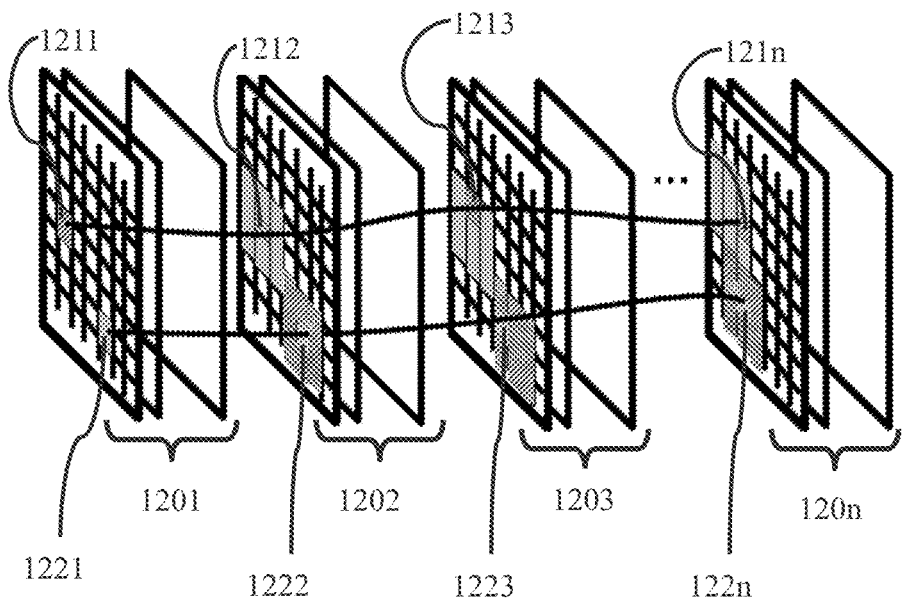
FIG.12
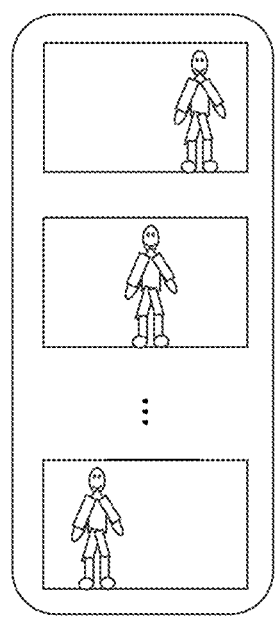 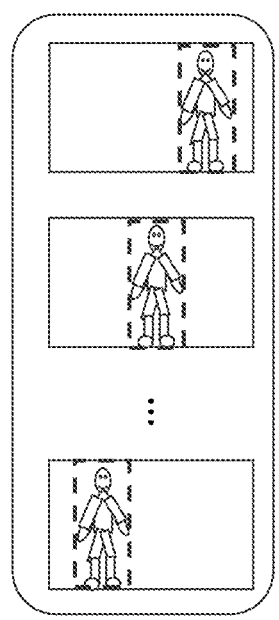 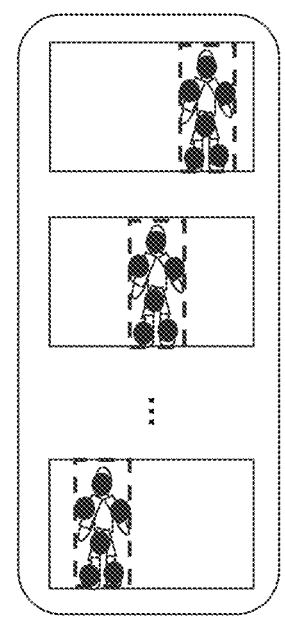
FIG.13A  FIG.13B  FIG.13C 1811　　　1821

1812　　　1822

IMAGE PROCESSING APPARATUS AND METHOD, AND IMAGE PROCESSING SYSTEM

CROSS-REFERENCE TO RELATED APPLICATIONS

This application claims the benefit of Chinese Patent Application No. 201910018399.9, filed Jan. 9, 2019, which is hereby incorporated by reference herein in its entirety.

BACKGROUND OF THE INVENTION

Field of the Invention

The present disclosure relates to an image processing, and more particularly to detecting and/or tracking of an object in, for example, a video.

Description of the Related Art

In video surveillance processing, detecting and tracking an object (e.g. a specific target) in a video in real time is a critical task. For example, in a security monitoring aspect, by detecting and tracking in real time a suspicious target (e.g. a suspicious person) in a video acquired in real time from a monitored place, the position of the suspicious target in the monitored place can be quickly located, thereby enabling a monitoring person to make subsequent processing in time. For example, in a scene understanding aspect, by detecting and tracking an object in a video of a certain scene in real time and by analyzing the detected object and its motion trajectory, the category and real-time status of the scene can be obtained. For example, whether the scene is an intersection or a one-way street, whether the scene is a sidewalk or a runway, and whether the scene is crowded or not, and so on.

In the process of detecting and tracking an object in a video, the object tracking may be usually performed by detecting the object on a frame-by-frame basis and then associating the detected objects, or by detecting the object in key video frames and then using a tracking algorithm. In recent years, with the development of neural networks, the neural networks have made great progress in object detection, and an exemplary method of detecting an object in a video using the neural networks is disclosed in "Object Detection in Videos with Tubelet Proposal Networks" (Kai Kang, Hongsheng Li, Tong Xiao, Wanli Ouyang, Junjie Yan, Xihui Liu, Xiaogang Wang; CVPR 2017). The exemplary method is mainly as follows: firstly, an object is positioned in non-initial video frames in a video through one neural network (for example, a Tubelet Proposal Network) for object positioning, and then the positioning results are classified by one neural network (for example, a Long Short-Term Memory Network) for object classification to obtain a final object detection result. Wherein for an initial video frame in the video, the exemplary method detects a position of the object therein and uses the position as an initial position of the object in each non-initial video frame to enable the detection of the object in the non-initial video frames.

As described above, it can be seen that in the process of detecting an object in a video, the above exemplary method implements object detection by two independent stages (i.e. an object positioning stage and an object classification stage). Since the two-stage operation requires performing network calculations twice, for example, it requires performing feature extractions twice (for example, extracting features for object positioning and extracting features for object classification), and requires respectively performing positioning and classification operations etc., the entire object detection processing requires more processing time, which in turn affects the real-time requirements for detecting and tracking the object in the video, namely, affecting the real-time requirements of video surveillance.

SUMMARY OF THE INVENTION

In view of the above recordation in the related art, the present disclosure is directed to solve at least one of the above problems.

According to an aspect of the present disclosure, there is provided an image processing apparatus comprising: an extraction unit that extracts features from video frames of a video; a determination unit that determines, for non-initial video frames in the video, reference information of an object detected in a previous video frame thereof in a corresponding non-initial video frame with respect to object information of the object; and a detection unit that detects, for an initial video frame in the video, an object from the initial video frame based on the features; and detects, for the non-initial video frames in the video, an object from a corresponding non-initial video frame based on the features and the determined reference information. The video includes, for example, N video frames, where N is a natural number and N≥3. The object information of one object detected in one video frame at least comprises: a position of the object in the video frame, and an occurrence probability of occurrence of the object in each area of a next video frame. The object detection operation performed by the detection unit is to detect an area of an object in a video frame or detect a key point of an object in a video frame. The image processing apparatus performs corresponding operations using a pre-generated second neural network.

According to another aspect of the present disclosure, there is provided an image processing method comprising: an extraction step of extracting features from video frames of a video; a determination step of determining, for non-initial video frames in the video, reference information of an object detected in a previous video frame thereof in a corresponding non-initial video frame with respect to object information of the object; and a detection step of detecting, for an initial video frame in the video, an object from the initial video frame based on the features; and detecting, for the non-initial video frames in the video, an object from a corresponding non-initial video frame based on the features and the determined reference information. The video includes, for example, N video frames, where N is a natural number and N≥3. The object information of one object detected in one video frame at least comprises: a position of the object in the video frame, and an occurrence probability of occurrence of the object in each area of a next video frame. The object detection operation performed in the detection step is to detect an area of an object in a video frame or detect a key point of an object in a video frame. The image processing method performs corresponding operations using a pre-generated second neural network.

According to still another aspect of the present disclosure, there is provided an image processing apparatus comprising: an acquisition device that acquires a video; a storage device that stores instructions; and a processor that executes the instructions based on the acquired video, so that the processor at least implements an image processing method, the image processing method comprising: an extraction step of extracting features from video frames of a video; a determination step of determining, for non-initial video frames in the video, reference information of an object detected in a previous video frame thereof in a corresponding non-initial video frame with respect to object information of the object; and a detection step of detecting, for an initial video frame in the video, an object from the initial video frame based on the features; and detecting, for the non-initial video frames in the video, an object from a corresponding non-initial video frame based on the features and the determined reference information.

According to yet another aspect of the present disclosure, there is provided an image processing system comprising: an acquisition apparatus that acquires a video; an image processing apparatus that detects an object from the acquired video, the image processing apparatus comprising: an extraction unit that extracts features from video frames of the video; a determination unit that determines, for non-initial video frames in the video, reference information of an object detected in a previous video frame thereof in a corresponding non-initial video frame with respect to object information of the object; and a detection unit that detects, for an initial video frame in the video, an object from the initial video frame based on the features, and detects, for the non-initial video frames in the video, an object from a corresponding non-initial video frame based on the features and the determined reference information; and a post-processing apparatus that performs a subsequent image processing operation based on the detected object, wherein the acquisition apparatus, the image processing apparatus, and the post-processing apparatus are connected to each other via a network.

Since the present disclosure associates/constrains the detection of an object in a subsequent video frame by acquiring features that can be used for each operation and by the object (especially, object information) detected in a previous video frame, the present disclosure can realize the detection of the object in the video with a one-stage processing, so that the processing time of the entire object detection processing can be reduced, and thus the real-time requirements for detecting objects in the video can be better satisfied, that is, the real-time requirements for video surveillance can be better satisfied. Furthermore, since the present disclosure detects the object in the video with the one-stage processing, it does not involve requiring additional storage space to store, for example, information (e.g., features or other information) obtained in an intermediate processing stage, so that the storage space may be also saved.

Other features and advantages of the present disclosure will become apparent from the following description of exemplary embodiments with reference to the accompanying drawings.

BRIEF DESCRIPTION OF THE DRAWINGS

The accompanying drawings, which are incorporated in and constitute a part of the specification, illustrate embodiments of the present disclosure and, together with the description of the embodiments, serve to explain the principles of the present disclosure.

FIG. 12 schematically shows an example of an anchor flow constructed by two objects in a video in accordance with the present disclosure.

FIGS. 13A to 13C schematically show examples of object detection results according to the present disclosure.

DESCRIPTION OF THE EMBODIMENTS

Figure 1:
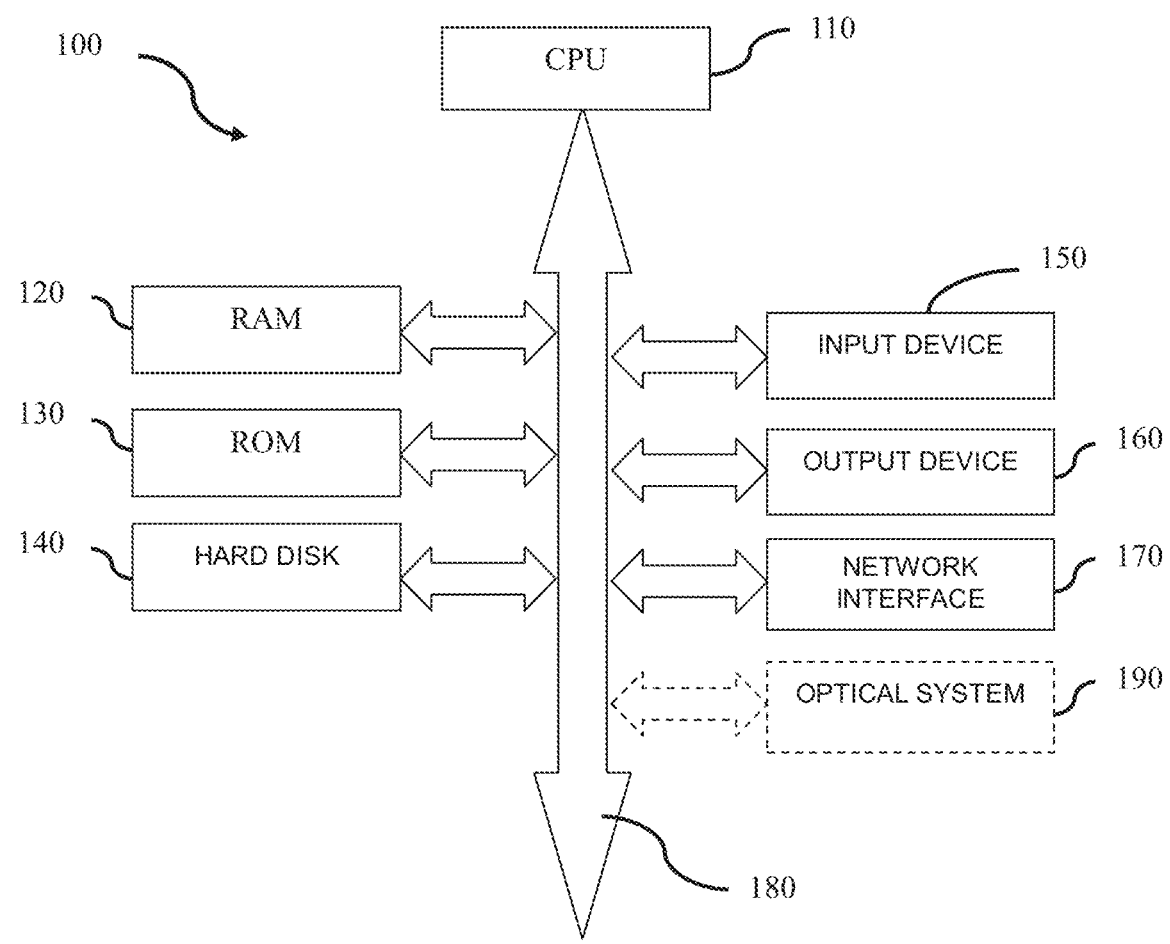
FIG. 1 is a block diagram schematically showing a hardware configuration with which a technique according to an embodiment of the present disclosure can be implemented.

Exemplary embodiments of the present disclosure will be described in detail below with reference to the accompanying drawings. It should be noted that the following description is merely illustrative and exemplary, and is in no way intended to limit the present disclosure and its application or use. Unless otherwise specifically stated, relative arrangements of components and steps, numerical expressions and numerical values set forth in the embodiments are not intended to limit the scope of the present disclosure. In addition, techniques, methods, and devices known to those skilled in the art may not be discussed in detail, but should be a part of the present specification where appropriate.

It is noted that like reference numerals and letters refer to like items in the drawings, and therefore, once an item is defined in one figure, it is not necessarily discussed in the following figures.

For a video, on the one hand, generally, the change of relevant information (i.e. object information) of one object in adjacent video frames is small, wherein object information of one object in one video frame includes, for example, a position of the object, an occurrence probability of occurrence of the object in each area of a next video frame, a width and a height of an area of the object, a category of the object, and the like. Therefore, it appears that one video frame (except for an initial video frame) and one object therein, reference information of the object in the video frame can be determined based on the object information detected in a previous video frame of the video frame, and an offset of the object is determined using, for example, a regression algorithm based on the determined reference information, to obtain the object information for the object in the video frame. In the present disclosure, the object information may be regarded as an anchor, for example, and the reference information may be regarded as a reference anchor, for example. On the other hand, the changes in features (e.g. visual features) extracted from adjacent video frames are generally small and associated. Accordingly, it appears that features (e.g., which can be regarded as shared features) that can represent the content of the entire video can be obtained by fusing corresponding features extracted from adjacent video frames, and the shared features can be used for each operation of the object detection processing in the video. Thus, it appears that the detection of the object in the video can be achieved with a one-stage processing by two aspects of the above analysis. Furthermore, as described above, the detection of the object in a subsequent video frame requires reference to the detection result of the object in the previous video frame. Therefore, for one object in a video, the object may be associated with an information flow (e.g., which may be regarded as an anchor flow) constructed by the object information detected in each video frame. Thus, it appears that tracking of the object in the video can also be achieved while detecting the object in the video through a one-stage processing.

Thus, on the one hand, since the detection of the object in the video can be realized through the one-stage processing, the processing speed of the object detection in the video can be improved according to the present disclosure, that is, the processing time of the object detection in the video can be reduced. On the other hand, since the tracking of the object in the video can be realized while the detection of the object in the video is realized through the one-stage processing, the processing speed of the object detection and tracking in the video can be improved according to the present disclosure, that is, the processing time of the object detection and tracking in the video can be reduced. Thus, according to the present disclosure, the real-time requirements for detecting and tracking the object in the video can be better satisfied, that is, the real-time requirements of video surveillance can be better satisfied. Furthermore, since the present disclosure detects the object in the video with the one-stage processing, it does not involve requiring additional storage space to store, for example, information (e.g., features or other information) obtained in an intermediate processing stage, so that the storage space can be also saved.

(Hardware Configuration)

First of all, a hardware configuration that can implement the technology described below will be described with reference to FIG. 1.

The hardware configuration 100 includes, for example, a central processing unit (CPU) 110, a random access memory (RAM) 120, a read only memory (ROM) 130, a hard disk 140, an input device 150, an output device 160, a network interface 170, and a system bus 180. Moreover, in one implementation, the hardware configuration 100 can be implemented by a computer, such as a tablet, a laptop, a desktop, or other suitable electronic devices. In another implementation, the hardware configuration 100 can be implemented by a monitoring device, such as a digital camera, a video camera, a web camera, or other suitable electronic devices. In a case where the hardware configuration 100 is implemented by a monitoring device, the hardware configuration 100 further includes, for example, an optical system 190.

In one implementation, an image processing apparatus according to the present disclosure is configured of hardware or firmware and functions as a module or component of the hardware configuration 100. For example, the image processing apparatus 200, which will be described in detail below with reference to FIG. 2, functions as a module or component of the hardware configuration 100. In another implementation, the image processing apparatus according to the present disclosure is configured by software stored in the ROM 130 or the hard disk 140 and executed by the CPU 110. For example, a process 300, which will be described later in detail with reference to FIG. 3, and a process 1100, which will be described later in detail with reference to FIG. 11, function as programs stored in the ROM 130 or the hard disk 140.

The CPU 110 is any suitable programmable control device (such as a processor), and can perform various functions to be described below by executing various applications stored in the ROM 130 or the hard disk 140 (such as a memory). The RAM 120 is used for temporarily storing programs or data loaded from the ROM 130 or the hard disk 140, and is also used as a space where the CPU 110 executes various processes (such as, implementations of techniques that will be described in detail below with reference to FIGS. 4 to 11, 14, and 17) and other available functions. The hard disk 140 stores various information such as an operating system (OS), various applications, control programs, videos, images, pre-generated networks (e.g. neural networks), pre-defined data (e.g. thresholds (THs)), and the like.

In one implementation, the input device 150 is used to allow a user to interact with the hardware configuration 100. In one example, the user may input videos/data through the input device 150. In another example, the user can trigger a corresponding processing of the present disclosure through the input device 150. Furthermore, the input device 150 can adopt many forms, such as a button, a keyboard, or a touch screen. In another implementation, the input device 150 is used to receive a video output from a specialized electronic device such as a digital camera, a video camera, and/or a web camera. Additionally, where the hardware configuration 100 is implemented by a monitoring device, the optical system 190 in the hardware configuration 100 will directly capture videos of the monitored location.

In one implementation, the output device 160 is used to display a processing result (such as a detected object) to a user. Moreover, the output device 160 can adopt various forms such as a cathode ray tube (CRT) or a liquid crystal display. In another implementation, the output device 160 is used to output processing results to subsequent image processing, such as security monitoring, scene understanding, and the like.

The network interface 170 provides an interface for connecting the hardware configuration 100 to a network. For example, the hardware configuration 100 can perform data communication with other electronic devices connected via a network via the network interface 170. Alternatively, the hardware configuration 100 may be provided with a wireless interface for performing wireless data communication. The system bus 180 can provide data transmission paths for transmitting data between the CPU 110, the RAM 120, the ROM 130, the hard disk 140, the input device 150, the output device 160, the network interface 170, the optical system 190, and the like. Although the system bus 180 is referred to as a bus, it is not limited to any particular data transmission technique.

The above hardware configuration 100 is merely illustrative and is in no way intended to limit the present disclosure and its application or use. Moreover, for the sake of concise, only one hardware configuration is shown in FIG. 1. However, multiple hardware configurations may be used as needed.

(Image Processing Apparatus and Method)

Next, an image processing according to the present disclosure will be described with reference to FIGS. 2 to 13C.

Figure 2:
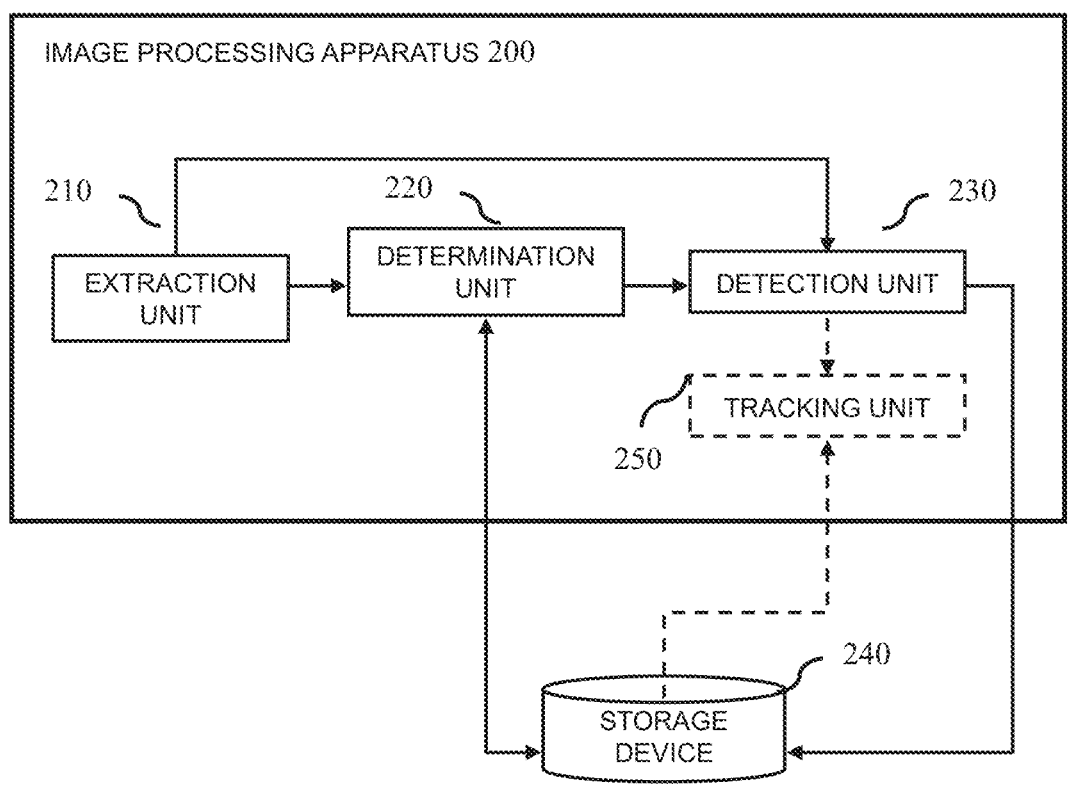
FIG. 2 is a block diagram illustrating a configuration of an image processing apparatus according to an embodiment of the present disclosure.

FIG. 2 is a block diagram illustrating a configuration of an image processing apparatus 200 according to an embodiment of the present disclosure. Some or all of modules shown in FIG. 2 may be implemented by dedicated hardware. As shown in FIG. 2, the image processing apparatus 200 includes an extraction unit 210, a determination unit 220, and a detection unit 230. The image processing apparatus 200 can be used, for example, to detect an object (for example, an object such as a human body or a vehicle) from a video.

In addition, the storage device 240 shown in FIG. 2 stores, for example, at least information (for example, reference information and reference anchors) determined by the determination unit 220 and information (for example, object information and anchors) detected by the detection unit. In one implementation, the storage device 240 is the ROM 130 or the hard disk 140 shown in FIG. 1. In another implementation, the storage device 240 is a server or an external storage device that is connected to the image processing apparatus 200 via a network (not shown).

First, in one implementation, for example, in a case where the hardware configuration 100 shown in FIG. 1 is implemented by a computer, the input device 150 receives a video that is output from a specialized electronic device (e.g. a video camera, etc.) or input by a user. Next, the input device 150 transmits the received video to the image processing apparatus 200 via the system bus 180. In another implementation, for example, in a case where the hardware configuration 100 is implemented by a monitoring device, the image processing apparatus 200 directly uses a video captured by the optical system 190.

Figure 3:
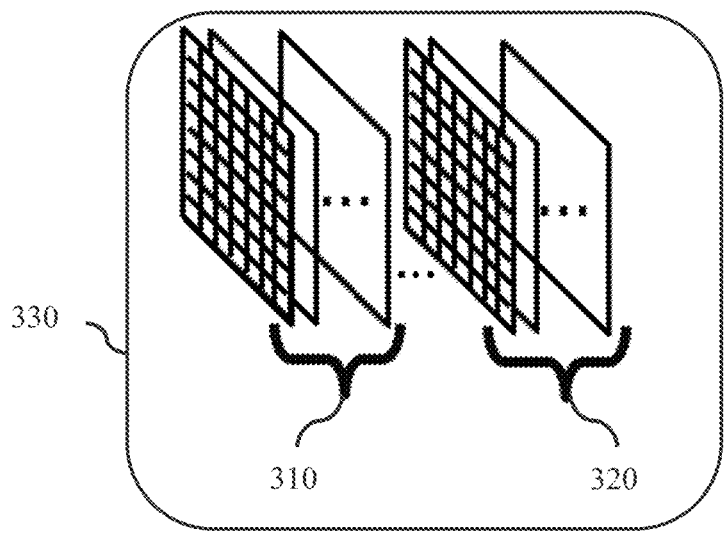
FIG. 3 schematically shows an example of a shared feature.

Then, as shown in FIG. 2, the extraction unit 210 extracts features from video frames of the received video. In the present disclosure, the extracted features can be regarded as, for example, shared features, but are obviously not limited thereto. The received video includes, for example, N video frames, where N is a natural number and $N \geq 3$. In the present disclosure, the extraction unit 210 extracts a first feature from each video frame of the received video, for example, to obtain a shared feature. In one implementation, the extraction unit 210 may obtain the shared feature by joining the first features separately extracted from adjacent video frames together. For example, FIG. 3 schematically shows an example of a shared feature. As shown in FIG. 3, 310 represents a first feature extracted from an initial video frame, for example; 320 represents a first feature extracted from one (e.g. a second video frame) of the non-initial video frames, for example; and 330 represents the shared feature obtained, for example.

In one implementation, the extraction unit 210 extracts the first feature separately from adjacent video frames by utilizing an existing feature extraction algorithm or a pre-generated neural network, for example. In another implementation, since the features between adjacent video frames have high similarities and complementarities, after extracting a corresponding feature (e.g. a global feature) from an initial video frames in the video, a corresponding feature may be extracted from a low resolution image of an adjacent non-initial video frame in the video, wherein the low resolution image of the non-initial video frame is obtained by down-sampling, for example. Thus, in order to reduce the repetitive calculations to improve the processing speed of object detection in the video, the extraction unit 210 extracts the first feature separately from the original image of the initial video frame and the low resolution image of the adjacent non-initial video frame by utilizing an existing feature extraction algorithm or a pre-generated neural network, for example. However, it is obviously not limited to this. The feature extraction algorithms that can be used are, for example, a local binary pattern (LBP) algorithm, a histogram of oriented gradient (HOG) algorithm, or the like. The pre-generated neural network is, for example, a VGG16 structure, a ResNet structure, a SENet structure, or the like. In the present disclosure, the pre-generated neural network may be regarded as a second neural network and stored in, for example, the storage device 240. Hereinafter, a method for pre-generating the second neural network will be described in detail with reference to FIGS. 16 to 19B.

Returning to FIG. 2, after the extraction unit 210 obtains the shared feature, on the one hand, for the initial video frame, the detection unit 230 detects the object from the initial video frame using, for example, a regression algorithm, based on the shared feature, and stores object information of the detected object into, for example, the storage device 240. On the other hand, for an adjacent non-initial video frame (e.g. a second video frame, . . . , an n-th video frame, etc.), firstly, the determination unit 220 acquires the object information of the object detected in a previous video frame of the non-initial video frame from, for example, the storage device 240, and determines reference information of the object in a corresponding non-initial video frame with respect to the acquired object information. At the same time, the determination unit 220 may also store the determined reference information into, for example, the storage device 240. Then, the detection unit 230 detects the object from the corresponding non-initial video frame using, for example, a regression algorithm, based on the shared feature and the determined reference information, and also stores the object information of the detected object into, for example, the storage device 240. Hereinafter, the above object information may be referred to as an anchor, for example, and the above reference information may be referred to as a reference anchor, for example.

In the present disclosure, for each video frame in the video, the object detection operation performed by the detection unit 230 is to detect an area of an object in each video frame or to detect a key point of an object in each video frame. Further, as an alternative, the corresponding detection operations may also be separately performed by a dedicated object detection unit (not shown) and a dedicated key point detection unit (not shown).

In the present disclosure, in a case where the detection unit 230 detects an area of an object in each video frame, an anchor of one object detected in one video frame includes at least: a position of the object in the video frame, and an occurrence probability of occurrence of the object in each area of a next video frame. Meanwhile, the anchor may further include: width and height information of the area of the object, category information of the object, and the like. In a case where the detection unit 230 detects a key point of an object in each video frame, an anchor of one object detected in one video frame includes at least: a position of the object in the video frame, and an occurrence probability of occurrence of the object in each area of a next video frame. Meanwhile, the anchor may further include: width and height information of the area of the object, category information of the object, a position of each key point of the object in the video frame, and the like.

As described above, for one object in a video, the object can be associated with an anchor flow constructed by anchors detected in each video frame. Thus, the image processing apparatus 200 may further include a tracking unit 250. The tracking unit 250 acquires the anchor of the object detected in the initial video frame and the reference anchor determined in the non-initial video frame from, for example, the storage device 240 to associate the object in each video frame in the received video. Specifically, the tracking unit 250 constructs an anchor flow by utilizing the anchor of the object detected in the initial video frame and the reference anchor determined in the non-initial video frame, and associates the object in each video frame in the received video based on the constructed anchor flow to achieve the purpose of tracking the object in the video.

Further, as described above, the extraction unit 210 can perform a corresponding operation using a pre-generated second neural network stored in, for example, the storage device 240. Likewise, the determination unit 220 and the detection unit 230 may also perform corresponding operations using a pre-generated second neural network stored, for example, in storage device 240. Hereinafter, a method for pre-generating the second neural network will also be described in detail with reference to FIGS. 16 to 20B.

Finally, the detection unit 230 or the tracking unit 250 transmits the processing result (e.g. the detected/tracked object) to the output device 160 via the system bus 180 shown in FIG. 1, for displaying the detected/tracked object to the user or for outputting the processing result to a subsequent image processing such as security monitoring, scene understanding, and the like.

Figure 4:
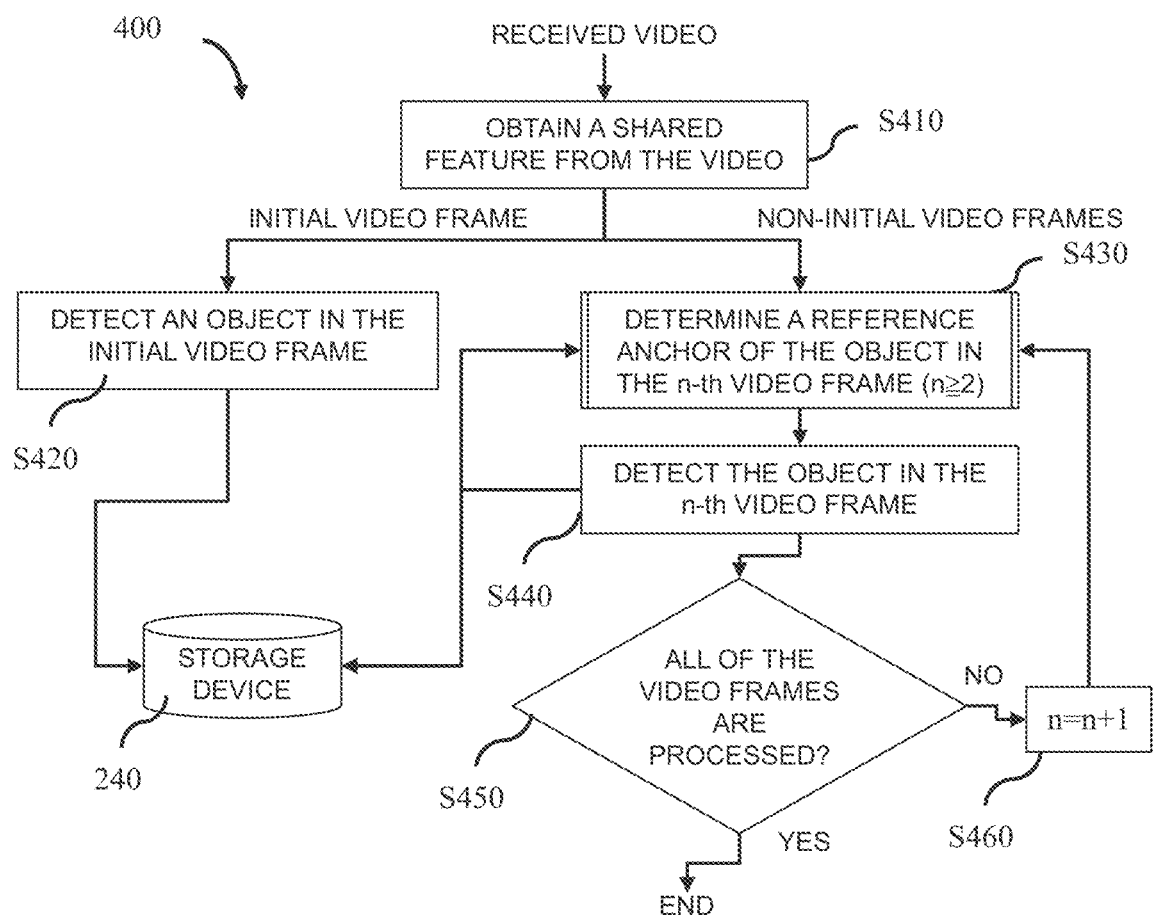
FIG. 4 schematically shows a flow chart of an image processing method according to an embodiment of the present disclosure.

A flow chart 400 shown in FIG. 4 is a corresponding process of the image processing apparatus 200 shown in FIG. 2.

As shown in FIG. 4, in an extraction step S410, the extraction unit 210 extracts features from the video frames of the received video. That is, the extraction unit 210 extracts the first feature from the adjacent video frames of the received video to obtain the shared feature.

After obtaining the shared feature, for the initial video frame (i.e. the first video frame), in step S420, the detection unit 230 detects the object from the initial video frame using, for example, a regression algorithm based on the shared feature, and stores the anchor of the detected object into the storage device 240. For a non-initial video frame (e.g. the n-th video frame, such as n=2), in determination step S430, the determination unit 220 acquires the anchor of the detected object in the previous video frame (i.e. the (n−1)-th video frame) of the n-th video frame from the storage device 240, and determines the reference anchor of the object in the n-th video frame with respect to the acquired anchor. At the same time, the determination unit 220 may also store the determined reference anchor in the storage device 240. Herein, 2≤n≤N, N represents the total length of the received video.

As described above, for a video, the change of relevant information (i.e., anchor) of one object in adjacent video frames is generally small. Therefore, for the n-th video frame, the reference anchor of the object in the n-th video frame may be determined from the surrounding relative to the anchor of the object detected in the (n−1)-th video frame in the n-th video frame. Further, as described above, whether it is to detect an area of an object in a video frame or to detect a key point of an object in a video frame, an anchor of one object detected in one video frame includes at least: a position of the object in the video frame, and an occurrence probability of occurrence of the object in each area of a next video frame. Thus, in one implementation, for the n-th video frame, the determination unit 220 determines the reference anchor of the object in the n-th video frame by determining the candidate information of the object in the n-th video frame from the surrounding area of the corresponding position of the n-th video frame, based on the position of the object detected in the (n−1)-th video frame. In the present disclosure, the above candidate information can be regarded as a candidate anchor, for example. Hereinafter, the above candidate information is referred to as a candidate anchor, for example. Specifically, for one object in the (n−1)-th video frame, the determination unit 220 determines the reference anchor of the object in the n-th video frame with reference to FIG. 5. In this case, the determination unit 220 shown in FIG. 2 may include a candidate anchor determination unit (not shown) and a reference anchor determination unit (not shown), for example.

Figure 5:
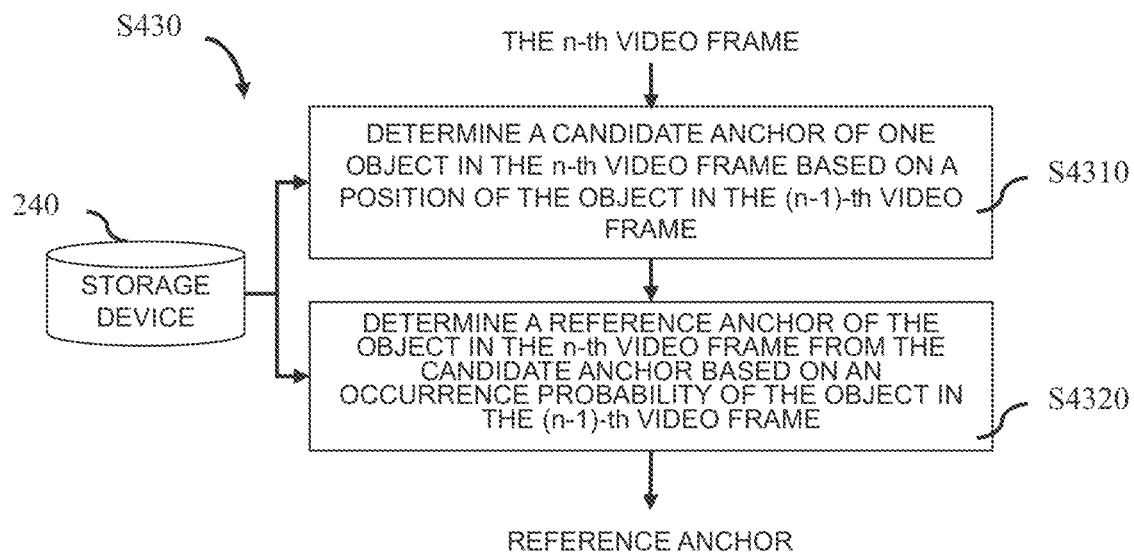
FIG. 5 schematically shows a flow chart of a determination step S430 as shown in FIG. 4 according to the embodiment of the present disclosure.

As shown in FIG. 5, in step S4310, on the one hand, the determination unit 220 or the candidate anchor determination unit obtains the position of the object in the (n−1)-th video frame from the storage device 240, and determines a position (e.g., which can be regarded as a "corresponding position") corresponding to the position in the n-th video frame. On the other hand, the determination unit 220 or the candidate anchor determination unit determines a candidate anchor of the object in the n-th video frame from the surrounding area of the corresponding position.

Figure 6:
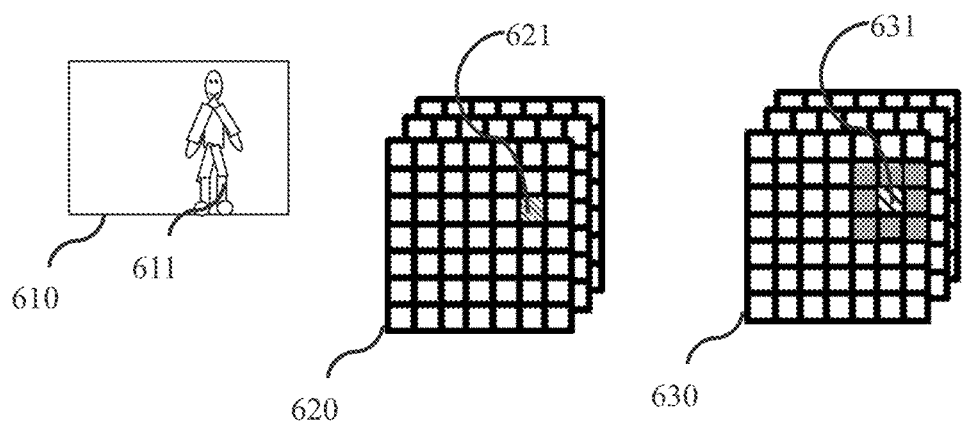
FIG. 6 schematically shows an example of determining a candidate anchor.

In one implementation, the determination unit 220 or the candidate anchor determination unit may directly determine an anchor at an adjacent position of the corresponding position determined in the n-th video frame as the candidate anchor of the object in the n-th video frame. For example, as shown in FIG. 6, it is assumed that 610 represents the (n−1)-th video frame, wherein one object in the video frame is, for example, a human body 611. It is assumed that the (n−1)-th video frame is represented, for example, by a feature map 620, wherein 621 represents a position of the human body 611 in the video frame, for example. It is assumed that the n-th video frame is represented, for example, by a feature map 630, wherein 631 represents a corresponding position determined in the video frame, for example, and wherein a grey area portion around 631 represents the determined candidate anchor, for example.

Figure 7:
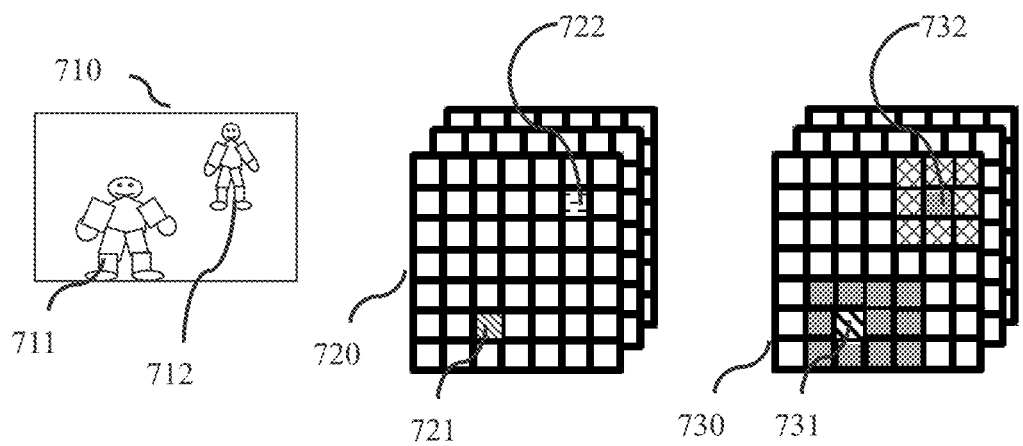
FIG. 7 schematically shows another example of determining a candidate anchor.

In another implementation, since there are generally differences in the scales of different objects at the same time or the same object at different times in a video, in order to be able to more accurately determine candidate anchors to improve the accuracy of object detection, the determination unit 220 or the candidate anchor determination unit may determine a candidate anchor of the object in the n-th video frame from the surrounding area of the corresponding position determined in the n-th video frame, based on the scale of the object in the (n−1)-th video frame. Specifically, the determination unit 220 or the candidate anchor determination unit may determine a proportion of the object occupied in the entire (n−1)-th video frame based on the width and height information of the area of the object detected in the (n−1)-th video frame, and determine the candidate anchor of the object in the n-th video frame from the surrounding area of the corresponding position determined in the n-th video frame based on the proportion. For example, as shown in FIG. 7, it is assumed that 710 represents the (n−1)-th video frame, wherein one object in the video frame is, for example, a human body 711, and another object is, for example, a human body 712; as can be seen from the figure, the scale of the human body 711 is larger than the scale of the human body 712. It is assumed that the length and width information of the entire (n−1)-th video frame is 7*7, and it is assumed that the length and width information of the human body 711 in the (n−1)-th video frame is 4*3, and the length and width information of the human body 712 in the (n−1)-th video frame is 3*3. Then, it can be seen that the proportion of the human body 711 in the (n−1)-th video frame is 4*3, and the proportion of the human body 712 in the (n−1)-th video frame is 3*3. It is assumed that the (n−1)-th video frame is represented, for example, by a feature map 720, wherein 721 represents a position of the human body 711 in the video frame, for example, and 722 represents a position of the human body 712 in the video frame, for example. It is assumed that that the n-th video frame is represented, for example, by the feature map 730, and it is assumed that the length and width information of the entire n-th video frame is also 7*7, wherein 731 represents, for example, a corresponding position determined in the video frame for the human body 711, and 732 represents, for example, a corresponding position determined in the video frame for the human body 712; according to the proportion of the human body 711 in the (n−1)-th video frame, the grey area portion around 731 represents, for example, the determined candidate anchor for the human body 711; and according to the proportion of the human body 712 in the (n−1)-th video frame, the portion of the area formed by small boxes around 732 represents, for example, the determined candidate anchor for the human body 712.

Figure 8:
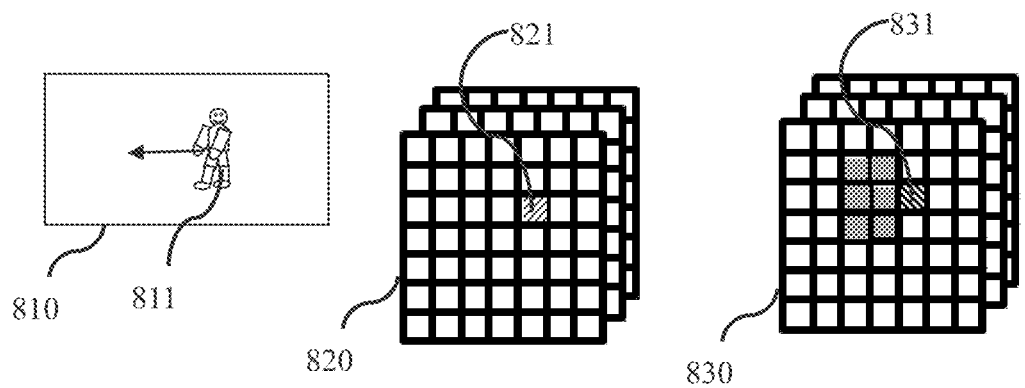
FIG. 8 schematically shows still another example of determining a candidate anchor.

In still another implementation, since the object between the video frames in a video has motion information, in order to be able to determine a more suitable candidate anchor to improve the speed of object detection, the determination unit 220 or the candidate anchor determination unit may determine the candidate anchor of the object in the n-th video frame from the surrounding area of the corresponding position determined in the n-th video frame, based on a motion trend of the object from the (n−1)-th video frame to the n-th video frame. In one implementation, the motion trend of the object from the (n−1)-th video frame to the n-th video frame can be obtained, for example, by utilizing an existing optical flow algorithm. In another implementation, the motion trend of the object from the (n−1)-th video frame to the n-th video frame may be determined based on apparent information (e.g., size invariant feature transform (SIFT) features, histogram of oriented gradient (HOG) features, etc.) of the object in the (n−1)-th video frame, for example. For example, the motion trend of the human body can be determined by the orientation of a human face, and the motion trend of the vehicle can be determined by the orientation of the head of a vehicle. In still another implementation, the motion trend of the object from the (n−1)-th video frame to the n-th video frame may be determined, for example, based on key point information of the object in the (n−1)-th video frame. For example, the motion trend of the human body in the front-rear direction can be determined by the joint point information of the left and right arms and the left and right legs of the human body, and the motion trend of the human body in the left-right direction can be determined by the scale of the human body and the joint point information of the left and right shoulders and the left and right hips of the human body. For example, as shown in FIG. 8, it is assumed that 810 represents the (n−1)-th video frame, wherein one object in the video frame is, for example, a human body 811, wherein an arrow in 810 represents, for example, the motion trend of the human body 811. It is assumed that the (n−1)-th video frame is represented, for example, by a feature map 820, wherein 821 represents the position of the human body 811 in the video frame, for example. It is assumed that the n-th video frame is represented, for example, by a feature map 830, wherein 831 represents a corresponding position determined in the video frame, for example, and wherein a grey area portion around 831 represents the determined candidate anchor, for example. In addition, at the same time, the scale and motion trend of the object can also be utilized to determine the candidate anchor of the object in the n-th video frame. For example, after the scale of the object is used to determine the candidate anchor of the object in the n-th video frame, the motion information of the object is then used to further determine the candidate anchor. Thus, the speed of object detection can be improved compared with a case where only the scale of the object is used to determine the candidate anchor. For example, after the motion trend of the object is used to determine the candidate anchor of the object in the n-th video frame, the scale of the object is then used to further determine the candidate anchor. Thus, the accuracy of object detection can be improved compared with a case where only the motion trend of the object is used to determine the candidate anchor.

Figure 9:
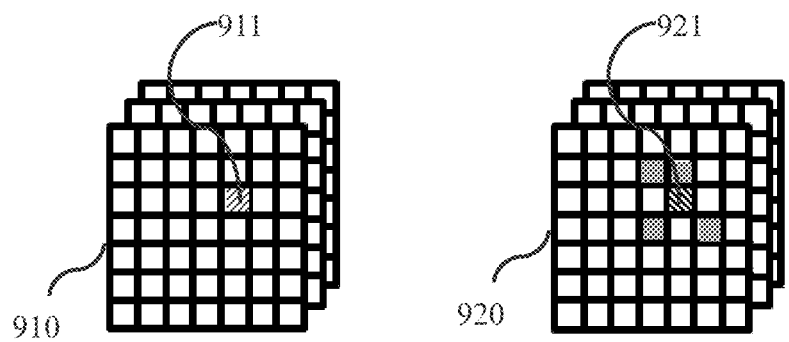
FIG. 9 schematically shows yet another example of determining a candidate anchor.

In yet another implementation, in order to enable the present disclosure to be adaptively applied to various scenarios to obtain a more robust candidate anchor, thereby improving the accuracy of object detection, the determination unit 220 or the candidate anchor determination unit may determine the candidate anchor of the object in the n-th video frame from the surrounding area of the corresponding position determined in the n-th video frame via a pre-generated neural network (e.g., which can be regarded as the first neural network), based on the shared feature extracted by the extraction step S410 shown in FIG. 4. The pre-generated first neural network may also be stored in the storage device 240, for example, and is obviously not limited thereto. Hereinafter, a method for pre-generating the first neural network will be described in detail with reference to FIGS. 14 to 15C. For example, as shown in FIG. 9, it is assumed that the (n−1)-th video frame is represented, for example, by a feature map 910, wherein 911 represents a position of one object in the (n−1)-th video frame, for example. It is assumed that the n-th video frame is represented, for example, by a feature map 920, wherein 921 represents a corresponding position determined in the video frame, for example, and wherein a grey area portion around 921 represents the determined candidate anchor, for example.

Figure 10:
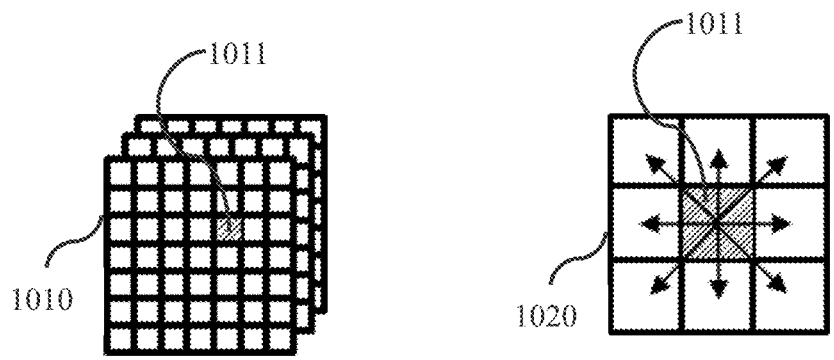
FIG. 10 schematically shows an example of possible directions of motion of an object.

Returning to FIG. 5, for one object in the (n−1)-th video frame, after determining the candidate anchor of the object in the n-th video frame, in step S4320, on the one hand, the determination unit 220 or the reference anchor determination unit obtains an occurrence probability of occurrence of the object detected in the (n−1)-th video frame in each area of the n-th video frame from the storage device 240. For example, as shown in FIG. 10, it is assumed that the (n−1)-th video frame is represented, for example, by a feature map 1010, wherein 1011 represents a position of the object in the (n−1)-th video frame, for example; and then a direction in which the object may move towards each area of the n-th video frame is, for example, as shown by 1020 in FIG. 10, wherein each arrow in 1020 represents, for example, a possible direction of motion of the object, although it is obviously not limited thereto. Thus, there is a corresponding occurrence probability for the area involved in each possible direction of motion of the object. According to the above process of determining the candidate anchor, it can be seen that each of the determined candidate anchors of the object in the n-th video frame corresponds to one occurrence probability.

Therefore, on the other hand, after obtaining the occurrence probability, the determination unit 220 or the reference anchor determination unit determines the reference anchor of the object in the n-th video frame from the determined candidate anchors based on the obtained occurrence probability. In one implementation, the candidate anchor with the greatest occurrence probability may be determined as the reference anchor of the object in the n-th video frame. If there are multiple candidate anchors having the same largest occurrence probability, one of the candidate anchors may be arbitrarily selected as the reference anchor of the object in the n-th video frame. In another implementation, the reference anchor of the object in the n-th video frame may be determined based on the determined candidate anchor by an existing dynamic programming algorithm.

Returning to FIG. 4, after determining the reference anchor of the object in the n-th video frame, in step S440, the detection unit 230 detects an object by using, for example, a regression algorithm, from the n-th video frame based on the shared feature extracted in the extraction step S410 and the reference anchor determined in the determination step S430, and also stores the detected anchor of the object into the storage device 240, for example.

In step S450, the image processing apparatus 200 shown in FIG. 2 judges whether all of the video frames have been processed, that is, whether n is greater than N or not. If it is judged that n is greater than N, the process of the flow chart 400 shown in FIG. 4 is ended. Otherwise, in step S460, n=n+1 will be set, and corresponding operations from step S430 to step S450 are repeatedly performed.

Finally, returning to FIG. 4, the detecting unit 230 transmits the processing result (e.g. the detected object) to the output device 160 via the system bus 180 shown in FIG. 1, for displaying the detected object to the user or for outputting the processing result to a subsequent image processing such as security monitoring, scene understanding, and the like.

Further, as described above, the image processing apparatus 200 shown in FIG. 2 can be further used to track the object in the video. Thus, the flow chart 1100 shown in FIG. 11 is another corresponding process of the image processing apparatus 200 shown in FIG. 2.

Figure 11:
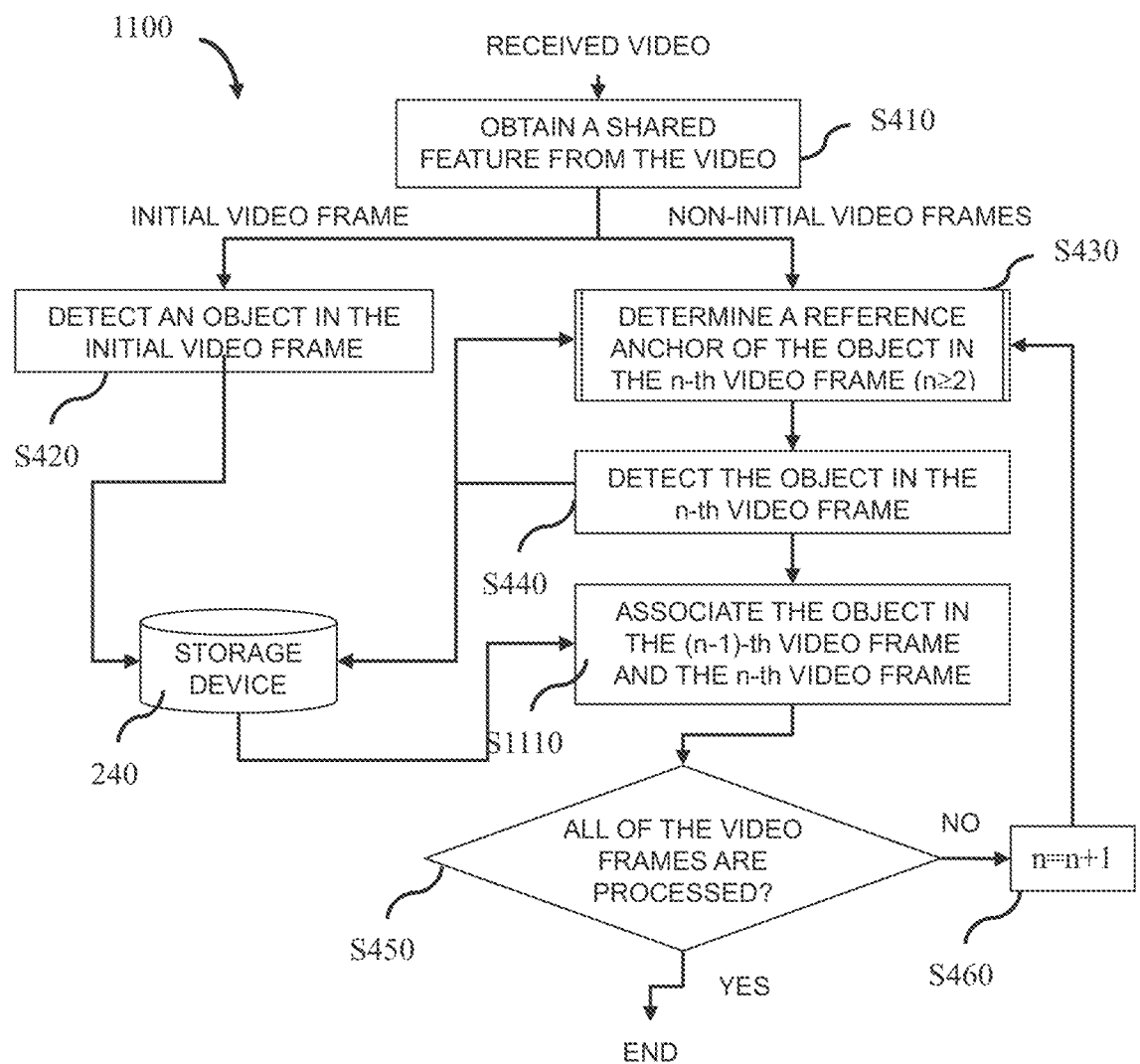
FIG. 11 schematically shows another flow chart of an image processing method according to an embodiment of the present disclosure.

As shown in FIG. 11, since the operations of step S410 to step S460 are the same as the operations of step S410 to step S460 shown in FIG. 4, details thereof are not described herein again.

After detecting the object in the n-th video frame via step S440, in a tracking step S1110, the tracking unit 250 acquires the reference anchors determined in the (n−1)-th video frame and the n-th video frame from the storage device 240 to associate the object in the two video frames. In a case of n=2, for the (n−1)-th video frame (i.e. the initial video frame), the anchor of the object detected in the initial video frame is obtained. Specifically, for any one object of the objects detected in the n-th video frame, the tracking unit 250 constructs one anchor flow by using reference anchors which correspond to the object and are determined in the (n−1)-th video frame and the n-th video frame, and associates the corresponding object in the two video frames based on the anchor flow. Then, in step S450, the image processing apparatus 200 shown in FIG. 2 judges whether all of the video frames have been processed, that is, whether n is greater than N or not. If it is judged that n is greater than N, the process of the flow chart 1100 shown in FIG. 11 is ended. Otherwise, in step S460, n=n+1 will be set, and the corresponding operations from step S430 to step S450 and step S1110 are repeatedly performed to achieve the purpose of tracking the object in the video. For one object in a video, for example, a corresponding anchor flow may be constructed by directly connecting the determined positions of the object in the reference anchors corresponding to the object, thereby achieving the purpose of tracking the object. For example, as shown in FIG. 12, it is assumed that an initial video frame in a video is represented by a feature map 1201, a second video frame is represented by a feature map 1202, a third video frame is represented by a feature map 1203, and a n-th video frame is represented by a feature map 120n. It is assumed that in the initial video frame, two objects are separately detected, wherein 1211 and 1221 represent the positions of the two objects in the initial video frame, respectively. It is assumed that 1212 to 121n represent the determined positions of the object in the reference anchor corresponding to one of the objects, respectively, and it is assumed that 1222 to 122n represent the determined positions of the object in the reference anchor corresponding to another of the objects, respectively. Thus, as described above, corresponding anchor flows can be constructed by directly connecting the respective positions, and two curves shown in FIG. 12 are represented as anchor flows constructed by the above two objects, for example.

Further, as described above with respect to the description of the image processing apparatus 200 shown in FIG. 2, similarly, the extraction step S410, the determination step S430, and the detection steps S420 and S440 shown in FIGS. 4 and 11 can also perform corresponding operations by using a pre-generated second neural network stored in the storage device 240, for example. Hereinafter, a method for pre-generating the second neural network will also be described in detail with reference to FIGS. 16 to 19B.

As described above, on the one hand, since the detection of the object in the video can be realized through the one-stage processing, the processing speed of the object detection in the video can be improved according to the present disclosure, that is, the processing time of the object detection in the video can be reduced. On the other hand, since the tracking of the object in the video can be realized while the detection of the object in the video is realized through the one-stage processing, the processing speed of the object detection and tracking in the video can be improved according to the present disclosure, that is, the processing time of the object detection and tracking in the video can be reduced. Thus, according to the present disclosure, the real-time requirements for detecting and tracking the object in the video can be better satisfied, that is, the real-time requirements of video surveillance can be better satisfied. Furthermore, since the present disclosure detects the object in the video with the one-stage processing, it does not involve requiring additional storage space to store, for example, information (e.g., features or other information) obtained in an intermediate processing stage, so that the storage space may be also saved.

For example, taking detecting one human body in a video (as shown in FIG. 13A) as an example, in the case of detecting an area of the human body in the video, the area of the human body detected according to an embodiment of the present disclosure is shown in a dotted box in FIG. 13B, for example. In the case of detecting a key point of a human body in a video, the area of the human body detected according to an embodiment of the present disclosure is shown in a dotted box in FIG. 13C, for example, and the detected key point of the human body is shown in small black dots in FIG. 13C, for example.

(Generation of Neural Networks)

As described above with respect to the description of step S4310 in FIG. 5, a pre-generated neural network (i.e. the first neural network described above) may be utilized in an embodiment of the present disclosure to determine candidate anchors of the objects in video frames.

Figure 14:
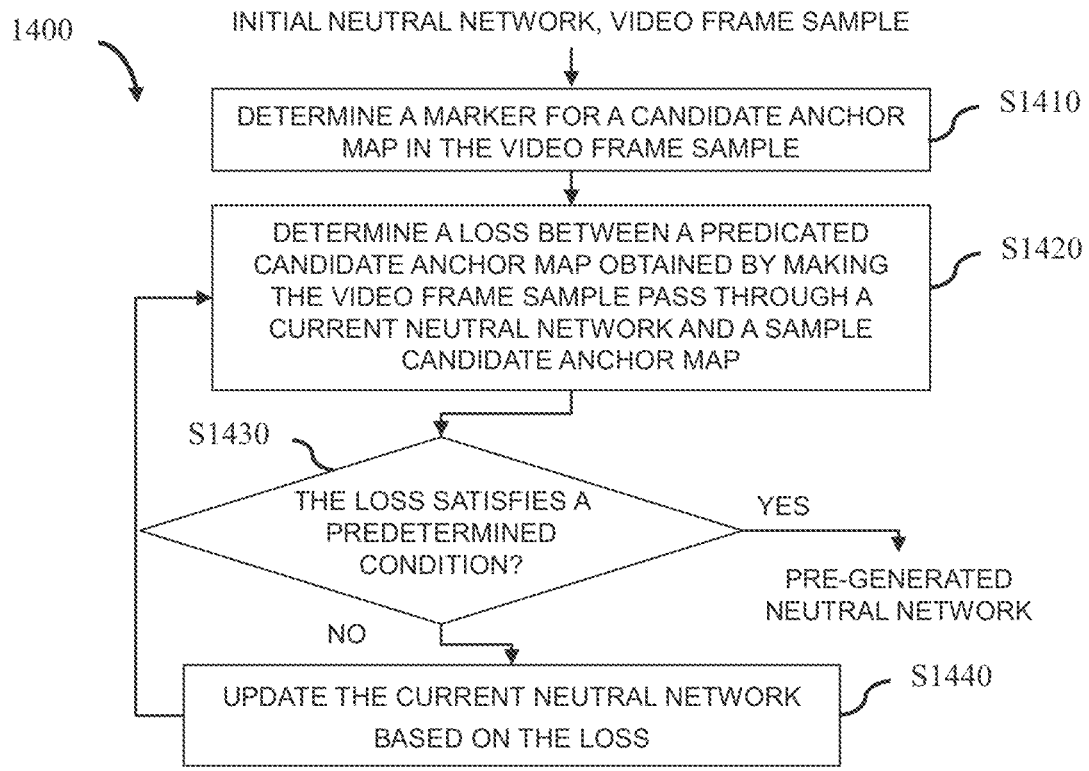
FIG. 14 schematically shows a flow chart of a generation method for pre-generating a first neural network that can be used in an embodiment of the present disclosure.

In one implementation, to reduce the time required for generating the first neural network, the update operation of the neural network will be performed in the manner of back propagation. FIG. 14 schematically shows a flow chart 1400 of a generation method for pre-generating the first neural network that can be used in an embodiment of the present disclosure. In the flow chart 1400 shown in FIG. 14, a neural network method in a deep learning method is used to generate a corresponding neural network as an example, but it is obviously not necessary to be limited thereto. The generation method with reference to FIG. 14 can also be performed by the hardware configuration 100 shown in FIG. 1.

As shown in FIG. 14, firstly, the CPU 110 as shown in FIG. 1 acquires a preset initial neural network and a plurality of video frame samples by the input device 150. Each video frame sample origins from a consecutive video sample, and each video frame sample is marked with a position of an object (i.e. a center position of the object), a width and a height of an area of the object, and a category of the object.

Figure 15A:
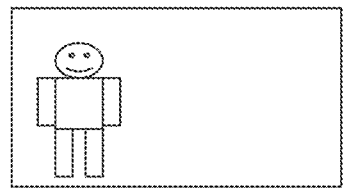
FIGS. 15A to 15C schematically show an example of anchor response maps and area maps constructed in one video frame sample.
Figure 15B:
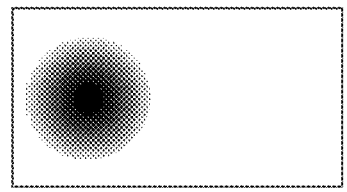
Figure 15C:
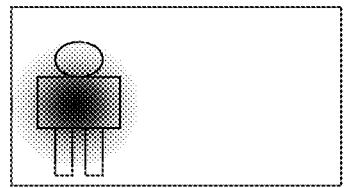

Then, in step S1410, for any two adjacent video frame samples, the CPU 110 determines the marker for the candidate anchor map of each object in the previous video frame sample, based on the position of each object and the width and height of the area of each object in the subsequent video frame sample. The candidate anchor map marked in each video frame sample can be regarded as a sample candidate anchor map (i.e. a real candidate anchor map). Each sample candidate anchor in the sample candidate anchor map has a sample occurrence probability (i.e., a true occurrence probability). In one implementation, the marker for the candidate anchor map is determined, for example, by a manner where: firstly, the CPU 110 determines an anchor response map for each object in the previous video frame sample based on the position of each object in the subsequent video frame sample, and for example, the position of each object in the subsequent video frame sample may be subjected to, for example, Gaussian diffusion to construct an anchor response map for each object in the previous video frame sample (for example, for an object as shown in FIG. 15A, its anchor response map is a black central radiation map as shown in FIG. 15B); next, the CPU 110 constructs an area map of the area in which each object is located in the previous video frame sample based on the constructed anchor response map and the width and height of the area of each object in the subsequent video frame sample (for example, for an object as shown in FIG. 15A, the constructed area map is a black central radiation map as shown in FIG. 15C); then, the constructed area map is transformed into the size of the neural network output map, and the transformed area map is determined as the marker for the candidate anchor map in the previous video frame sample.

In step S1420, on the one hand, the CPU 110 causes each video frame sample processed via step S1410 to pass through a current neural network (e.g. an initial neural network) to obtain a predicted candidate anchor map in each video frame sample. Each predicted candidate anchor in the predicted candidate anchor map has a predicted occurrence probability. On the other hand, for each video frame sample, the CPU 110 determines a loss (e.g., a first loss, Loss1) between the predicted candidate anchor map obtained in the video frame sample and the sample candidate anchor map in the subsequent video frame sample of the video frame sample. For each video frame sample, the first loss Loss1 represents an error between the predicted candidate anchor map obtained by the current neural network and the sample candidate anchor map. For each video frame sample, the first loss Loss1 includes an error between each predicted candidate anchor and the sample candidate anchor. The error between each prediction candidate anchor and the sample candidate anchor may be determined, for example, based on the following information: a difference between the predicted occurrence probability and the sample occurrence probability (for example, which may be calculated by a cross entropy loss function), a distance between the position of the predicted candidate anchor and the position of the sample candidate anchor (for example, which can be calculated by a squared difference loss function) and the like. In still another aspect, the CPU 110 obtains a loss sum based on the first loss Loss1 determined for each video frame sample. For example, the loss sum may be obtained by means of direct summation or by means of weighted summation.

In step S1430, the CPU 110 will judge whether the current neural network satisfies a predetermined condition based on the obtained loss sum. For example, the loss sum is compared with a threshold (e.g. TH1), and in the case where the loss sum is less than or equal to TH1, the current neural network is judged to satisfy the predetermined condition and be outputted as the final neural network (i.e. a pre-generated first neural network), wherein the final neural network is, for example, outputted to the storage device 240 shown in FIG. 2 so as to be used for determination of the candidate anchor as described in FIG. 5. In the case where the loss sum is greater than TH1, the current neural network is judged to have not satisfied the predetermined condition, and the generation process proceeds to step S1440.

In step S1440, the CPU 110 updates the current neural network based on the obtained loss sum, that is, updates the parameters of each layer in the current neural network. The parameters of each layer herein are, for example, weight values in each convolutional layer. In one example, the parameters of each layer are updated based on the loss sum, for example, using a stochastic gradient descent method. Thereafter, the generation process proceeds to step S1420 again.

In the flow 1400 shown in FIG. 14, whether the obtained loss satisfies a predetermined condition is taken as the condition of stopping the update of the current neural network. However, it is obviously not necessary to be limited to this. As an alternative, for example, step S1430 may be omitted, but the corresponding update operation is stopped after the number of updates to the current neural network reaches a predetermined number of times.

Figure 16:
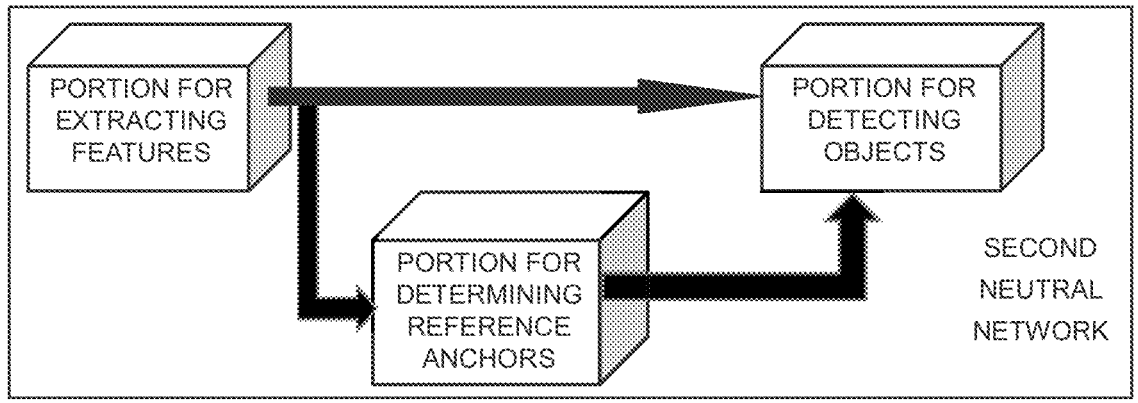
FIG. 16 schematically shows a schematic structure of a pre-generated second neural network used in an embodiment of the present disclosure.

As described above, a pre-generated neural network (i.e., the second neural network described above) can be utilized in an embodiment of the present disclosure to perform a corresponding operation. For example, as shown in FIG. 16, the pre-generated second neural network that may be used in embodiments of the present disclosure may include, for example, a portion for extracting features, a portion for determining reference anchors, and a portion for detecting objects. In the present disclosure, a corresponding neural network may be pre-generated by using a depth learning method (e.g., a neural network method), based on video frame samples in which a position of an object, a width and a height of an area of the object, and a category of the object are marked, wherein each video frame sample originates from a continuous video sample.

Figure 17:
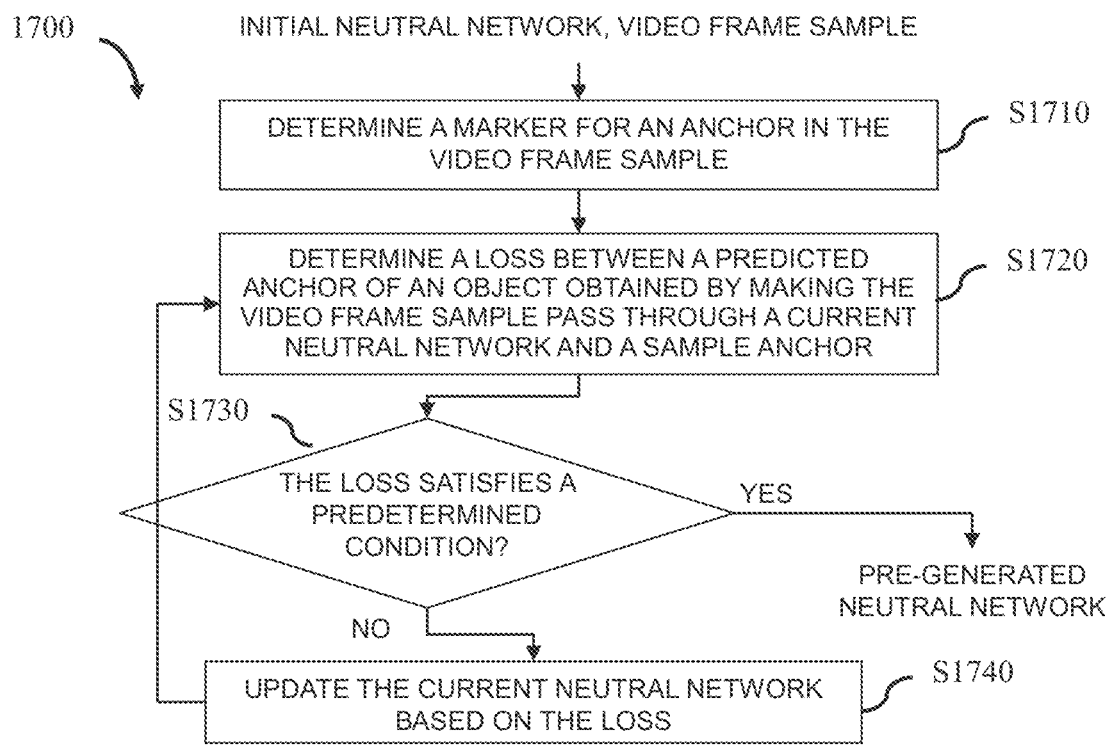
FIG. 17 schematically shows a flow chart of a generation method for pre-generating the second neural network that can be used in the embodiment of the present disclosure.

In one implementation, in order to reduce the time required for generating a neural network, the portion for extracting the features, the portion for determining the reference anchors, and the portion for detecting the objects in the neural network are commonly updated in the manner of back propagation. FIG. 17 schematically shows a flow chart 1700 of a generation method for pre-generating the second neural network that can be used in an embodiment of the present disclosure. In the flow chart 1700 shown in FIG. 17, a case where a neural network method is used to generate a corresponding neural network is described as an example, but it is obviously not necessary to be limited thereto. The generation method with reference to FIG. 17 can also be performed by the hardware configuration 100 shown in FIG. 1.

As shown in FIG. 17, firstly, the CPU 110 as shown in FIG. 1 acquires a preset initial neural network and a plurality of video frame samples by the input device 150. Each video frame sample originates from a consecutive video sample, and each video frame sample is marked with a position of an object (i.e. a center position of the object), a width and a height of an area of the object, and a category of the object.

Figure 18A:
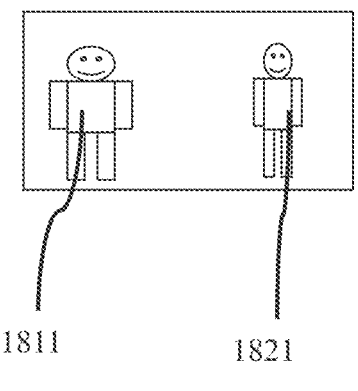
FIGS. 18A to 18B schematically show another example of anchor response maps constructed in one video frame sample.
Figure 18B:
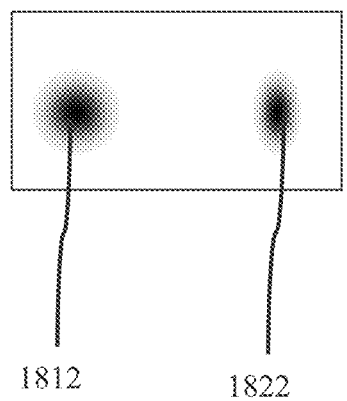
Figure 19A:
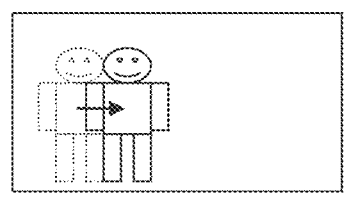
FIGS. 19A to 19B schematically show still another example of anchor response maps constructed in one video frame sample.
Figure 19B:
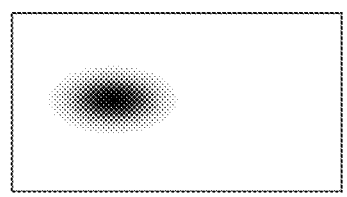

Then, in step S1710, for any two adjacent video frame samples, the CPU 110 determines the marker for the anchor (i.e. object information of an object) of each object in the previous video frame sample, based on at least the position of each object in the subsequent video frame sample. The anchor marked in each video frame sample can be regarded as a sample anchor (i.e. a real anchor). One sample anchor has one sample occurrence probability (i.e. a true occurrence probability). In one implementation, in a case where the marker for the anchor of each object in the previous video frame sample is determined only using the position of each object in the subsequent video frame sample, for example, firstly, the position of each object in the subsequent video frame sample is subjected to, for example, Gaussian diffusion to construct an anchor response map for each object in the previous video frame sample (for example, for the object as shown in FIG. 15A, its anchor response map is the black central radiation map as shown in FIG. 15B); then, the constructed anchor response map is transformed into the size of the neural network output map, and the transformed response map is determined as the marker for the anchor in the previous video frame sample. In another implementation, in a case where the marker for the anchor of each object in the previous video frame sample is determined using the position of each object and the scale of each object in the subsequent video frame sample, for example, firstly, after the position and scale of each object in a subsequent video frame sample are subjected to, for example, Gaussian diffusion to construct an anchor response map for each object in the previous video frame sample (for example, for an object 1811 as shown in FIG. 18A, its anchor response map is a black central radiation map 1812 as shown in FIG. 18B; for example, for an object 1821 as shown in FIG. 18A, its anchor response map is a black central radiation map 1822 as shown in FIG. 18B); then, the constructed anchor response map is transformed into the size of the neural network output map, and the transformed response map is determined as the marker for the anchor in the previous video frame sample. In still another implementation, in a case where the marker for the anchor of each object in the previous video frame sample is determined using the position of each object and the motion trend of each object in the subsequent video frame sample, for example, firstly, the position and the motion trend of each object in the subsequent video frame sample are subjected to, for example, Gaussian diffusion to construct an anchor response map for each object in the previous video frame sample (for example, for an object as shown in FIG. 19A, its anchor response map is an black central radiation map as shown in FIG. 19B); then, the constructed anchor response map is transformed into the size of the neural network output map, and the transformed response map is determined as the marker for the anchor in the previous video frame sample. Of course, the position of each object, the scale of each object, and the motion trend of each object in the subsequent video frame sample can also simultaneously be used to determine the marker for the anchor of each object in the previous video frame sample.

Then, in step S1720, on the one hand, the CPU 110 causes each video frame sample processed via step S1710 to pass through a current neural network (e.g. an initial neural network) to obtain a predicted anchor (i.e. predicted object information) of the object in each video frame sample. That is, the CPU 110 causes each video frame sample processed via step S1710 to sequentially pass through the portion for extracting the features, the portion for determining the reference anchors, and the portion for detecting the objects in the current neural network to obtain the predicted anchor of the object. One predicted anchor has one predicted occurrence probability. On the other hand, for each video frame sample, the CPU 110 determines the loss (e.g., a second loss, Loss2) between the anchor of the object obtained in the video frame sample and the sample anchor in the video frame sample. For each video frame sample, the second loss Loss2 represents an error between the predicted anchor obtained by the current neural network and the sample anchor. For each video frame sample, the second loss Loss2 includes an error between each predicted anchor and the sample anchor. The error between each predicted anchor and the sample anchor may be determined, for example, based on the following information: a difference between the predicted occurrence probability and the sample occurrence probability (for example, which may be calculated by a cross entropy loss function), a distance between the position of the predicted anchor and the position of the sample anchor (for example, which may be calculated by a squared difference loss function), a difference between the width and height of the area of the predicted object and the width and height of the area of the sample object (for example, which may be calculated by a squared difference loss function), a distance between the category of the predicted object and the category of the sample object (for example, which may be calculated by a cross entropy loss function), and the like. In still another aspect, the CPU 110 obtains a loss sum based on the second loss Loss2 determined for each video frame sample. For example, the loss sum may be obtained by means of direct summation or by means of weighted summation. In addition, the related operations for determining the candidate anchors involved in the portion for determining the reference anchor in the neural network may be specifically obtained with reference to the flow chart 1400 shown in FIG. 14, and details thereof are not described herein again.

In step S1730, the CPU 110 judges whether the current neural network satisfies a predetermined condition based on the obtained loss sum. For example, the loss sum is compared with a threshold (e.g. TH2), and in the case where the loss sum is less than or equal to TH2, the current neural network is judged to satisfy the predetermined condition and be outputted as the final neural network (i.e. a pre-generated second neural network), wherein the final neural network is, for example, outputted to the storage device 240 shown in FIG. 2 so as to be used to the object detection as described in FIGS. 2 to 13C. In the case where the loss sum is greater than TH2, the current neural network is judged to have not satisfied the predetermined condition, and the generation process proceeds to step S1740.

In step S1740, the CPU 110 updates the current neural network based on the obtained loss sum, that is, sequentially updates the parameters of each layer in the portion for detecting the objects, the portion for determining the reference anchors, and the portion of extracting the features in the current neural network. The parameters of each layer herein are, for example, weight values in each convolutional layer in each portion described above. In one example, the parameters of each layer are updated based on the loss sum, for example, using a stochastic gradient descent method. Thereafter, the generation process proceeds to step S1720 again.

In the flow 1700 shown in FIG. 17, whether the obtained loss sum satisfies a predetermined condition is taken as the condition of stopping the update of the current neural network. However, it is obviously not necessary to be limited to this. As an alternative, for example, step S1730 may be omitted, but the corresponding update operation is stopped after the number of updates to the current neural network reaches a predetermined number of times.

(Application)

Figure 20:
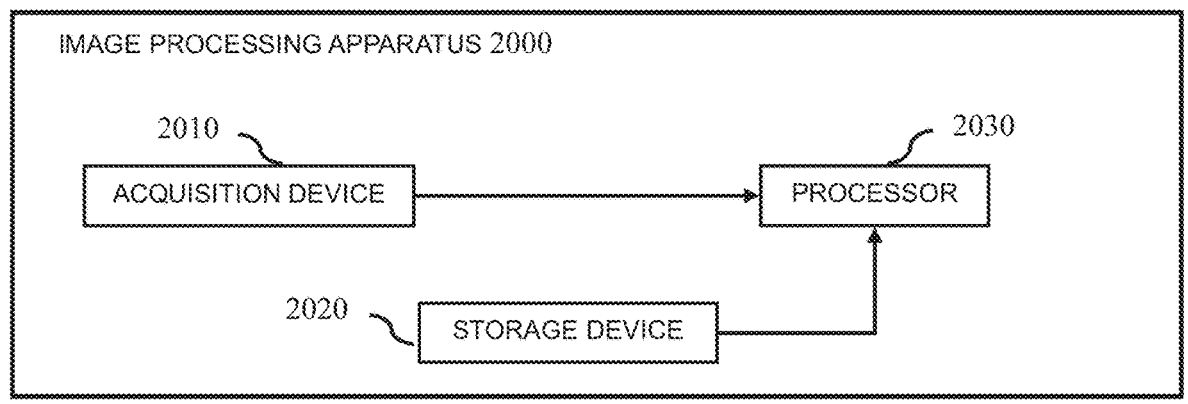
FIG. 20 shows an arrangement of an exemplary application apparatus in accordance with the present disclosure.

Further, as described above, the present disclosure can be implemented by a monitoring device (e.g., a web camera). Thus, as an application, taking a case where the present disclosure is implemented by a web camera as an example, FIG. 20 shows an arrangement of an exemplary image processing apparatus 2000 according to the present disclosure. As shown in FIG. 20, the image processing apparatus 2000 includes at least an acquisition device 2010, a storage device 2020, and a processor 2030. Obviously, the image processing apparatus 2000 may further include an input device, an output device, and the like, which are not shown.

As shown in FIG. 20, firstly, the acquisition device 2010 (e.g. the optical system of the web camera) captures video of a place of interest (e.g. a monitored place) and transmits the captured video to the processor 2030. The monitored place described above may be, for example, a place where it is required to perform security monitoring, scene understanding or the like.

The storage device 2020 stores instructions, wherein the stored instructions are at least instructions corresponding to the image processing methods as described in FIGS. 4 to 11.

The processor 2030 executes the stored instructions based on the captured video so that it can at least implement the image processing methods as described in FIGS. 4 to 11. Thus, the objects in the captured video can be detected or the objects in the captured video can be tracked.

In addition, in a case where the storage device 2020 further stores instructions for a subsequent image processing, for example, judging whether a suspicious person or the like appears in the monitored place, the processor 2030 may also execute corresponding subsequent image processing instructions based on the detected/tracked object to realize a corresponding operation. In this case, for example, an external display apparatus (not shown) can be connected to the image processing apparatus 2000 via a network, so that the external display apparatus can output subsequent image processing results (for example, appearance of a suspicious person, etc.) to a user/monitoring staff. Alternatively, the subsequent image processing instructions described above may also be executed by an external processor (not shown). In this case, the subsequent image processing instructions described above are stored, for example, in an external storage device (not shown), and, for example, the image processing apparatus 2000, the external storage device, the external processor, and the external display apparatus can be connected through a network. Thus, the external processor can execute subsequent image processing instructions stored in the external storage device based on the object detected/tracked by the image processing apparatus 2000, and the external display apparatus can output subsequent image processing results to the user/monitoring staff.

Figure 21:
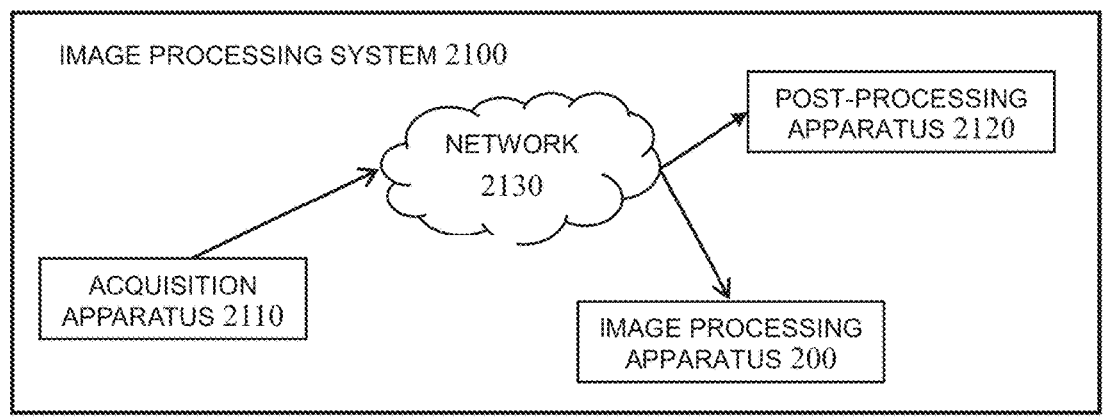
FIG. 21 shows an arrangement of an exemplary application system in accordance with the present disclosure.

Further, as described above, the present disclosure can also be implemented by a computer (e.g., a client server). Thus, as an application, taking a case where the present disclosure is implemented by a client server as an example, FIG. 21 shows an arrangement of an exemplary image processing system 2100 according to the present disclosure. As shown in FIG. 21, the image processing system 2100 includes an acquisition apparatus 2110 (e.g. at least one web camera), a post-processing apparatus 2120, and an image processing apparatus 200 as shown in FIG. 2, wherein the acquisition apparatus 2110, the post-processing apparatus 2120 and the image processing apparatus 200 are connected to each other via a network 2130. The post-processing apparatus 2120 and the image processing apparatus 200 can be implemented by the same client server, or can be implemented by different client servers.

As shown in FIG. 21, firstly, the acquisition apparatus 2110 captures a video of a place of interest (e.g. a monitored place) and transmits the captured video to the image processing apparatus 200 via the network 2130. The monitored place described above may be, for example, a place where it is required to perform security monitoring, scene understanding or the like.

The image processing apparatus 200 detects or tracks an object from the captured video with reference to FIGS. 2 to 11.

The post-processing apparatus 2120 performs a subsequent image processing operation, for example, of determining whether a suspicious person or the like appears in the monitored place, based on the detected/tracked object. In addition, the display apparatus or the alarm apparatus may be connected via the network 2130 so that the corresponding image processing results (for example, appearance of a suspicious person or the like) can be output to the user/monitoring staff.

All of the above units are exemplary and/or preferred modules for implementing the processes described in the present disclosure. These units may be hardware units (such as field programmable gate arrays (FPGAs), digital signal processors, application specific integrated circuits, etc.) and/or software modules (such as computer readable programs). The units used to implement various steps are not exhaustively described above. However, in a case where there is a step of performing a particular process, there may be a corresponding functional module or unit (implemented by hardware and/or software) for implementing the same process. The technical solutions by the steps described and all combinations of the units corresponding to these steps are included in the disclosure of the present application as long as the technical solutions they constitute are complete and applicable.

The method and apparatus of the present disclosure can be implemented in many ways. For example, the methods and apparatus of the present disclosure can be implemented by software, hardware, firmware, or any combination thereof. Unless otherwise specifically stated, the above-described order of steps of this method is merely intended to be illustrative, and the steps of the method of the present disclosure are not limited to the order specifically described above. Moreover, in some embodiments, the present disclosure may also be embodied as a program recorded in a recording medium, comprising machine readable instructions for implementing the method according to the present disclosure. Accordingly, the present disclosure also covers a recording medium storing a program for implementing the method according to the present disclosure.

Although some specific embodiments of the present disclosure have been shown in detail by way of examples, it is to be understood by those skilled in the art that the above examples are only intended to be illustrative, and not to limit the scope of the present disclosure. Those skilled in the art will appreciate that the above-described embodiments may be modified without departing from the scope and spirit of the present disclosure. The scope of the present disclosure is defined by the appended claims.

What is claimed is:

1. An image processing apparatus comprising:
    an extraction unit that extracts features from a first frame and a second frame captured after the first frame, wherein the first frame and the second frame are included in a video;
    a determination unit that determines, based on an anchor in the first frame which indicates a position of an object corresponding to a predetermined category, candidate anchors which may indicate positions of the object in the second frame; and
    a detection unit that detects, based on the extracted features and the determined candidate anchors, the object in the second frame,
    wherein the anchor in the first frame in the video at least comprises a position of the object and an occurrence probability indicating probability that the object of the predetermined category exists.

2. The image processing apparatus according to claim 1, wherein
    the determination unit determines, based on a position of an object detected in the first frame by using the anchor in the first frame, the candidate anchors for positions in the second frame corresponding to a region around the position of the object detected in the first frame.

3. The image processing apparatus according to claim 2, the determination unit determines, based on the occurrence probability of the object detected in the first frame, the candidate anchors in the second frame.

4. The image processing apparatus according to claim 3, wherein
    the determination unit determines the candidate anchors in the second frame from a surrounding area based on a scale of the object in the first frame.

5. The image processing apparatus according to claim 3, wherein,
    the determination unit determines the candidate anchors in the second frame from a surrounding area via a pre-generated first neural network based on the extracted features.

6. The image processing apparatus according to claim 1, further comprises:
    a tracking unit that associates the object in each video frame in the video based on a detected object in the first frame and the detected object in the second frame.

7. The image processing apparatus according to claim 1, wherein the extraction unit extracts a first feature from each video frame of the video to obtain the features, and
    wherein, for the second frame in the video, the extraction unit extracts the first feature from a low resolution image of the second frame.

8. The image processing apparatus according to claim 1, wherein the extraction unit, the determination unit, and the detection unit perform corresponding operations using a pre-generated second neural network.

9. The image processing apparatus according to claim 1, wherein the object detection operation performed by the detection unit is to detect an area of an object in a video frame or detect a key point of an object in a video frame.

10. An image processing method comprising:
    an extraction step of extracting features from a first frame and a second frame captured after the first frame, wherein the first frame and the second frame are included in a video;
    a determination step of determining, based on an anchor in the first frame which indicates a position of an object corresponding to a predetermined category, candidate anchors which may indicate positions of the object in the second frame; and
    a detection step of detecting, based on the extracted features and the determined candidate anchors, the object in the second frame,
    wherein the anchor in the first frame in the video at least comprises a position of the object and an occurrence probability indicating probability that the object of the predetermined category exists.

11. The image processing method according to claim 10, based on a position of the object detected in the first frame by using the anchor in the first frame, the candidate anchor for a position in the second frame corresponding to a region around the position of the object detected in the first frame.

12. The image processing method according to claim 10, further comprises:
    a tracking step of associating the object in each video frame in the video based on an object detected in the first frame and the object determined in the second frame in the second frame.

13. The image processing method according to claim 10, wherein in the extraction step, a first feature is extracted from each video frame of the video to obtain the features; and
    wherein, for the second frame, in the extraction step, the first feature is extracted from a low resolution image of a corresponding the second frame.

14. The image processing method according to claim 10, wherein in the extraction step, the determination step, and the detection step, corresponding operations are performed using a pre-generated second neural network.

15. The image processing method according to claim 10, wherein in the object detection operation performed in the detection step, an area of an object in a video frame or a key point of an object in a video frame is to detected.

16. An image processing apparatus comprising:
an acquisition device that acquires a video;
a storage device that stores instructions; and
a processor that executes the instructions based on the acquired video, so that the processor at least implements an image processing method, the image processing method comprising:
an extraction step of extracting features from a first frame and a second frame captured after the first frame, wherein the first frame and the second frame are included in a video;
a determination step of determining, based on an anchor in the first frame which includes a position of an object corresponding to a predetermined category, candidate anchors which may indicate positions of the object in the second frame; and
a detection step of detecting, based on the extracted features and the determined candidate anchors, the object in the second frame,
wherein the anchor in the first frame in the video at least comprises a position of the object and an occurrence probability indicating probability that the object of the predetermined category exists.

17. An image processing system comprising:
an acquisition apparatus that acquires a video;
an image processing apparatus that detects an object from the acquired video, the image processing apparatus comprising:
an extraction unit that extracts features from a first frame and a second frame captured after the first frame, wherein the first frame and the second frame are included in the video;
a determination unit that determines, based on an anchor in the first frame which indicates a position of an object corresponding to a predetermined category, candidate anchors which may indicate positions of the object in the second frame; and
a detection unit that detects, based on the extracted features and the determined candidate anchors, the object in the second frame; and
a post-processing apparatus that performs a subsequent image processing operation based on the detected object,
wherein the acquisition apparatus, the image processing apparatus, and the post-processing apparatus are connected to each other via a network,
wherein the anchor in the first frame in the video at least comprises a position of the object and an occurrence probability indicating probability that the object of the predetermined category exists.

18. The image processing apparatus according to claim 3, wherein the determination unit determines the candidate anchors in the second frame from a surrounding area based on a motion trend of the object from the first frame to the second frame.

19. The image processing method according to claim 10, wherein the candidate anchors in the second frame is determined based on the occurrence probability of the object detected in the first frame.

20. The image processing method according to claim 10, wherein the candidate anchors in the second frame is determined from a surrounding area via a pre-generated first neural network based on the extracted features.

* * * * *